United States Patent
Glasner et al.

(10) Patent No.: US 9,672,042 B2
(45) Date of Patent: Jun. 6, 2017

(54) PROCESSING SYSTEM AND METHOD OF INSTRUCTION SET ENCODING SPACE UTILIZATION

(75) Inventors: Roy Glasner, Ramat Gan (IL); Itzhak Barak, Kadima (IL); Yuval Peled, Kiryat Ono (IL); Idan Rozenberg, Raanana (IL); Lev Vaskevich, Rehovot (IL)

(73) Assignee: NXP USA, INC., Austin, TX (US)

( * ) Notice: Subject to any disclaimer, the term of this patent is extended or adjusted under 35 U.S.C. 154(b) by 448 days.

(21) Appl. No.: 14/396,146

(22) PCT Filed: May 29, 2012

(86) PCT No.: PCT/IB2012/052669
§ 371 (c)(1),
(2), (4) Date: Oct. 22, 2014

(87) PCT Pub. No.: WO2013/179085
PCT Pub. Date: Dec. 5, 2013

(65) Prior Publication Data
US 2015/0082005 A1    Mar. 19, 2015

(51) Int. Cl.
*G06F 9/30* (2006.01)
*G06F 9/38* (2006.01)

(52) U.S. Cl.
CPC ...... *G06F 9/30196* (2013.01); *G06F 9/30145* (2013.01); *G06F 9/30156* (2013.01); *G06F 9/3853* (2013.01)

(58) Field of Classification Search
CPC .................. G06F 9/30145; G06F 9/30156
See application file for complete search history.

(56) References Cited

U.S. PATENT DOCUMENTS

| | | | | |
|---|---|---|---|---|
| 5,781,750 A | * | 7/1998 | Blomgren | G06F 9/30145 703/26 |
| 5,922,065 A | | 7/1999 | Hull et al. | |
| 6,076,155 A | * | 6/2000 | Blomgren | G06F 9/30094 712/225 |
| 6,317,822 B1 | * | 11/2001 | Padwekar | G06F 9/30145 712/209 |
| 2002/0042909 A1 | | 4/2002 | Van Gageldonk et al. | |
| 2010/0042811 A1 | | 2/2010 | Peled et al. | |

FOREIGN PATENT DOCUMENTS

WO    2005036384 A2    4/2005

OTHER PUBLICATIONS

International Search Report and Written Opinion correlating to PCT/IB2012/052669 dated Feb. 27, 2013.

\* cited by examiner

*Primary Examiner* — Corey S Faherty

(57) ABSTRACT

A processing system comprises a processing device; a first instruction set encoded in a first encoding space and comprising one or more first instructions; a second instruction set encoded in a second encoding space different from the first encoding space and comprising two or more orthogonal second instructions; and an instruction encoder arranged to encode and encapsulate subsets of the second instructions in instruction containers, each instruction container sized to comprise a plurality of the second instructions.

14 Claims, 4 Drawing Sheets

PROCESSING SYSTEM AND METHOD OF INSTRUCTION SET ENCODING SPACE UTILIZATION

FIELD OF THE INVENTION

This invention relates to a processing system and a method of instruction set encoding space utilization.

BACKGROUND OF THE INVENTION

A very long instruction word (VLIW) processor or wide-issue processor is a processor operable to execute program instructions in parallel, i.e., to start execution of more than one instruction at the same time.

For many applications, such as image or video processing or other data processing applications, massive parallel execution of instructions efficiently reduces processing time. Parallel processing, in comparison to serial processing, usually requires more hardware resources such as execution units or processing cores arranged to process instructions independently from each other. It may also require more memory resources, e.g., random access memory, cache and registers, for storing processed data, as well as for storing and addressing an increased amount of instructions, i.e., an extended instruction set. In other words, the memory footprint or amount of memory a program occupies when being executed may increase.

Each instruction of an instruction set of a processor instructs the processor to execute a corresponding operation and is encoded using an opcode that specifies the operation to be performed, often combined with specifiers or addresses of locations of operands or data to be used when executing the operation.

An extended instruction set may, for example, be encoded using an enlarged encoding space, i.e., by uniformly providing more bits for encoding each instruction to implement a "full" encoding scheme. This may, for example, be useful in case of evenly distributed probabilities for most or all instructions to occur when executing a typical application of the particular processor. Other instruction encoding schemes may contain a trade off between size of encoded instructions and, for example, the amount of operands encoded within an instruction or orthogonality of operands.

In U.S. Pat. No. 5,922,065, a processor utilizing a template field for encoding instruction sequences in a wide-word format is shown. The instructions are encoded in 128 bit wide bundles, wherein it is defined which execution unit type of a processor will execute the particular instruction to allow simultaneous execution of sequential instructions.

SUMMARY OF THE INVENTION

The present invention provides a processing system and a method of instruction set encoding space utilization as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary, as illustrated, for the understanding and appreciation of the underlying concepts of the present invention and in order not to obfuscate or distract from the teachings of the present invention.

Figure 1:
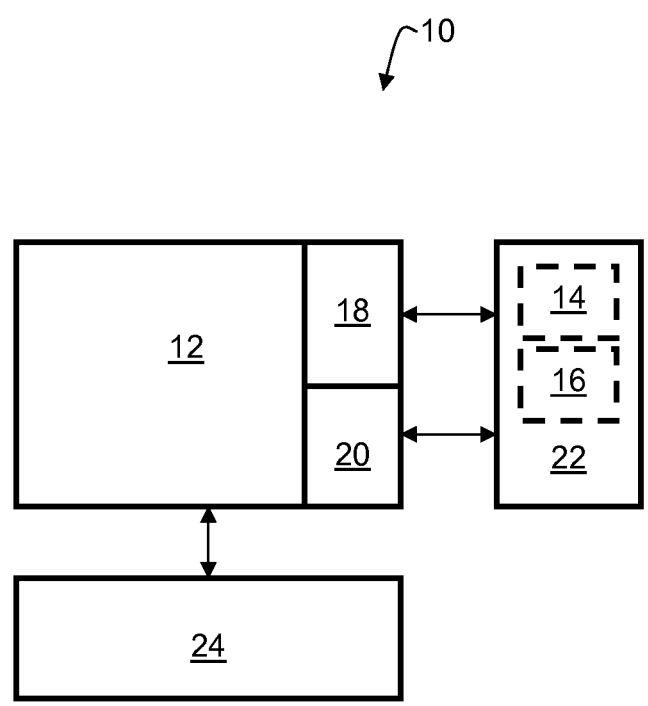
FIG. 1 schematically shows a block diagram of an example of an embodiment of a processing system.

Referring to FIG. 1, a block diagram of an example of an embodiment of a processing system 10 is schematically shown. A processing system 10 comprises a processing device 12; a first instruction set 14 encoded in a first encoding space and comprising one or more first instructions; a second instruction set 16 encoded in a second encoding space different from the first encoding space and comprising two or more orthogonal second instructions; and an instruction encoder 18 arranged to encode and encapsulate or group subsets of the second instructions in instruction containers, each instruction container sized to comprise a plurality of the second instructions.

The processing system may, for example, comprise an instruction decoder 20 arranged to extract, decode and provide each subset of second instructions to the processing device 12 operable to process in parallel each second instruction belonging to the extracted subset.

A processing device 12 may, for example, be a digital signal processor or any processor or processor core or part of a processor, such as an arithmetic logical unit (ALU), comprising a plurality of execution units, or a set of processors or processor cores, operable to simultaneously execute more than one instruction. A processing system 10 may, for example, refer to a processing device 12 and its instruction set or instruction set architecture (ISA), comprising an instruction encoder, e.g. provided in Assembler, and an instruction decoder, e.g. provided as dedicated circuitry coupled to or comprised in the processing device 12. It may also comprise memory devices such as a register file 22, which may provide the instruction sets, and a cache or random access memory 24 arranged to store and provide, for example, data being processed during execution of program instructions. In some embodiments, the processing device 12 may comprise at least a part of the memory. A processing system 10 may comprise a plurality of devices or it may be implemented as a single device, such as a microcontroller unit (MCU).

The instruction set of the shown processing device 12 is provided in, at least, two parts, a first 14 and a second instruction set 16, each encoded in a separate encoding space, allowing to have as many instructions as possible in the smallest possible encoding space (with respect to word width). This may allow to reduce program memory footprints and may increase efficiency of memory usage, since instructions belonging to the second instruction set 16 may be orthogonal instructions, i.e., execution of more than one second instruction at the same time may be possible independently of a current state of execution of another second instruction.

The instruction encoder 18 may be arranged to encode and encapsulate or group subsets of the second instructions in instruction containers. An instruction encoder 18 may, for example, be provided as software, in machine code or Assembler, e.g. as a part of a compiler operable to translate high-level programming into machine-code instructions, or it may be implemented using logic circuitry. A subset of the second instructions may comprise one or more than one second instructions. The instruction encoder 18 may be arranged to group one or a plurality of second instructions intended to be executed in parallel into a dedicated bit sequence or instruction container, i.e., each instruction container may be sized to comprise a plurality of the second instructions. The size of the instruction container may be chosen to contain at least two encoded instructions, since the second instruction set may be selected to comprise a high amount of instructions suitable for simultaneous, i.e., parallel processing. An odd number of second instructions may result in at least one instruction container comprising a single encoded second instruction.

The instruction decoder 20 may, for example, be implemented in software or as dedicated processing circuitry or may be implemented as a module of the processing device 12. It may extract the encoded second instructions from the container and decode and provide each of the second instructions comprised in the container to the processing device 12. The processing device 12 may be operable to process all second instructions belonging to the extracted subset simultaneously, i.e., in parallel.

Each instruction set may be used for a dedicated processing device for each instruction set. In the shown embodiment, the processing device 12 may be operable to process the first instructions and the second instructions. In order to use only a reduced amount of resources, the processing system 10 may comprise instruction encoder 18 and instruction decoder 20 operable to process both first and second instructions. Otherwise, it may, for example, comprise an additional instruction encoder and/or decoder dedicated to processing first instructions.

In order to minimize the program memory footprint and increase efficiency of memory usage, the shown processing system 10 may allow for massive parallel processing of instructions without overloading the first encoding space. Data processing instructions, such as, for example, "add", "subtract", "multiply", or "shift" often do not depend on other data processing instructions and can be executed simultaneously with different operands. Program flow instructions, such as, for example, control flow and memory access instructions, e.g., "jump", "loop", "load", or "store" usually need to be executed in a certain sequence and may be less suitable for parallel processing. The second instruction set 16 may comprise only data processing instructions. This may allow to increase the amount of parallel execution of data processing instructions while keeping the first encoding space available for instructions less suitable for parallel execution, i.e., the load on expensive encoding space may be reduced and a large amount of instructions may be encoded in a usually less used encoding space, with only low impact on program code size. It may help increase the benefit of each execution unit, e.g. processing core, by allowing high performance using a low number of execution units. The first instruction set may, for example, comprise program flow instructions, such as control flow or memory access instructions. It may, for example, also comprise data processing instructions less suitable for parallel processing.

The processing device 12 may be a wide-issue processor, such as a wide-issue digital signal processor, i.e. a VLIW processor operable to process wide word instructions by means of parallel processing. For example, program flow instructions may be encoded in a 32 bit regular first encoding space, which may be a small and expensive encoding space in terms of memory usage, and data processing instructions may be encoded in a cheaper 64 bit encoding space suitable for containing several instruction words and matching a wide-issue processor.

Figure 2:
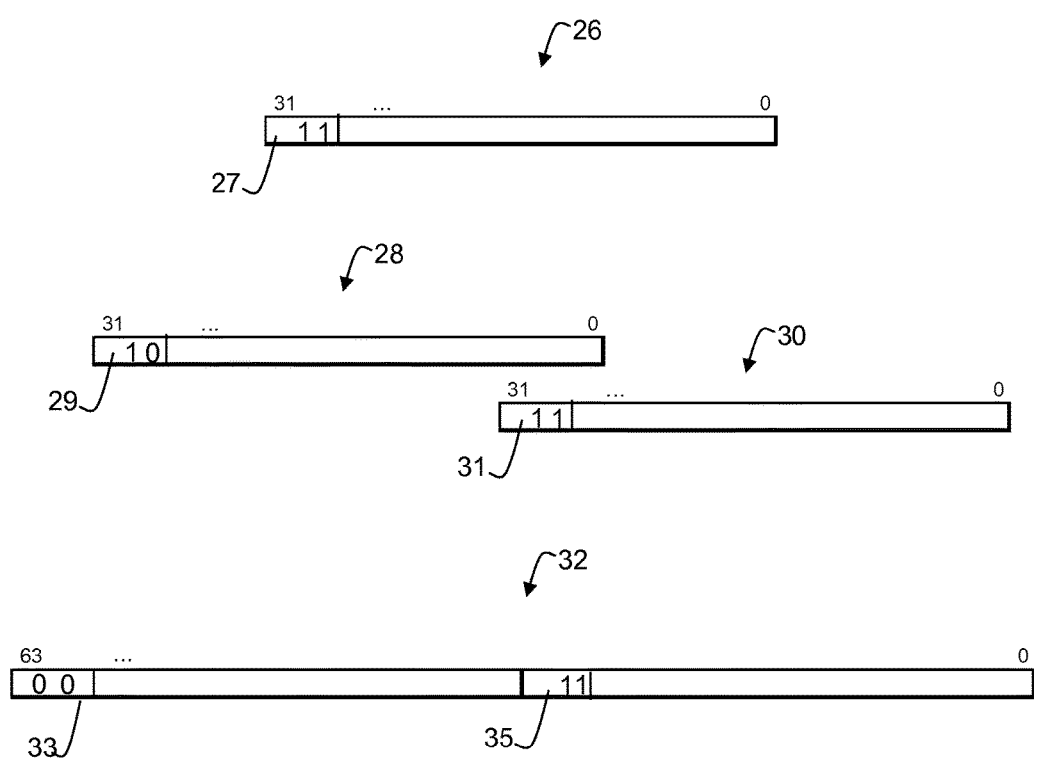
FIG. 2 schematically shows examples of encoded instructions.

Referring to FIG. 2, examples of encoded instructions are schematically shown. As an example, a single-issued 32 bit encoded instruction 26 is shown that may, for example correspond to an encoded first instruction and may, for example be a program flow instruction. An encoded instruction is an instruction comprising a code, such as an opcode that links the encoded instruction word or bit sequence, possibly comprising operand addresses, to the particular operation to be performed by the processing device 12. Depending on the employed processing device 12, other instruction lengths may be used, such as 8, 16, 64, 128 bits etc.

Two 32 bit instructions 28, 30 encoded in the first encoding space may, for example, be encoded as shown in FIG. 2, for parallel processing of the two instructions.

Two instructions, such as two data processing instructions or second instructions may be grouped as a container 32 and may be encoded using, for example, a 64 bit space. As shown, data processing instructions, as opposed to, for example, program flow instructions, may be encoded in a 32 bit size format, although the instructions may not be a part of the first or main 32 bit encoding space, therefore not occupying space in it. Instead, they may be packed in a 64 bit wide instruction container, which, in the shown example, may contain two orthogonal such instructions.

Figure 3:
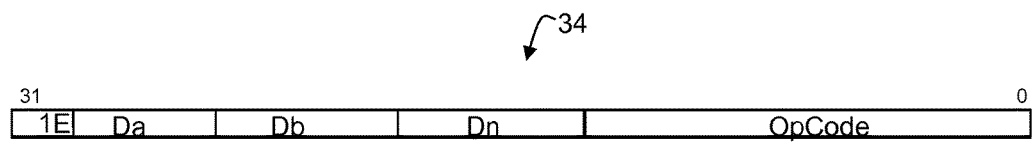
FIG. 3 schematically shows an example of a 32 bit data processing instruction format.

For the cases where an odd number of instructions may be required, several instructions may also be defined and encoded in the first or main 32-bit space. Sequences of instructions may comprise first, as well as second instructions. For example, a field or portion 27, 29, 31, 33, 35 comprising a subset of bits dedicated to an encoding scheme for encoding a presence and size of a container and position and length of used instruction words. The code may, for example, be based on a variable length encoding or block encoding scheme. The portion may, for example, comprise the most or least significant bits or may be distributed across the encoded instruction word. Referring to FIG. 3, an example of a 32 bit data processing instruction format is schematically shown. The shown encoded instruction 34 comprises an opcode field that may encode a specific unit and operation in the 32 bit encoding space. The space size available for instruction set encoding may depend on the size of the opcode field available for instruction identification. In the shown example, the available space size may be 2 to the power of the bit width of the opcode field. It may mostly be occupied, for example, by non-data processing instructions, such as program flow instructions. The shown "E" bit may be considered a sequence flag, wherein a value "1" may indicate a last instruction in an execution set or sequence. In the shown example, the instruction may comprise encoded operands, e.g. operand register addresses, Da, Db, and Dn. Other instructions may encode fewer, more or other operands.

Figure 4:
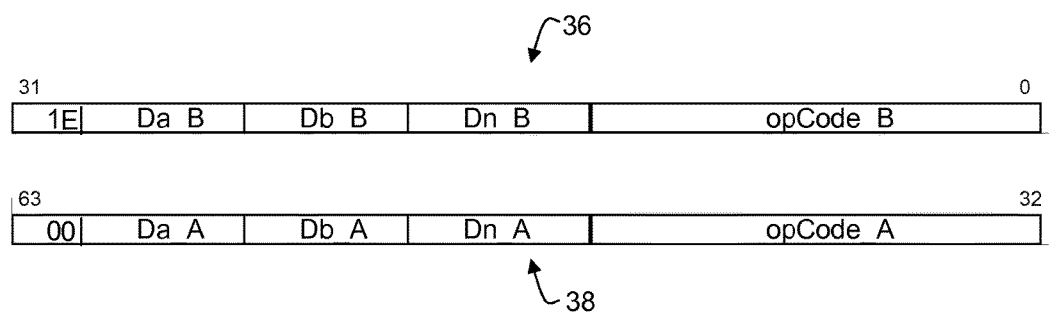
FIG. 4 schematically shows an example of a 64 bit instruction container containing two encoded 32 bit instructions.

Referring to FIG. 4, an example of a 64 bit instruction container containing two encoded 32 bit instructions 36, 38, is schematically shown. As an example, the shown container contains encoded instructions A and B, wherein OpCode_A and Opcode_B may both encode orthogonal instructions in a second encoding space, which may be a dual packed encoding space (64 bit) in the shown example. As an example, both encoded instructions comprise encoded operands Da_A, Da_B, Dn A, and Da_B, Db_B, Dn_B, respectively. Instructions A and B may always be executed simultaneously, i.e., in parallel. In the shown example, the encoding space size for identifying each instruction of the second instruction set may be 2 to the power of the bit width of the opcode field in addition to the space size of the 32 bit space according to FIG. 3.

The additional space size may be occupied by data processing instructions which may be suitable for parallel execution.

An identification, whether an encoded instruction belongs to the first or second encoding space may be achieved based on the instruction format. For example, a dedicated bit may be used for indicating whether the current instruction is a single 32 bit instruction encoded in a first encoding space or a first of a plurality of instructions contained in a container and encoded in the second, 64 bit encoding space.

In an embodiment, the format or payload format of the second encoded instructions may be identical to a format of the first encoded instructions. This may correspond to the same instruction format shown in FIG. 3 and FIG. 4. This may help avoid a need for a complex instruction decoder or a plurality of instruction decoders.

The width or size of the instruction containers may be a multiple of a width of the encoded first instruction, such as a 64 bit container compared to a regular 32 bit encoded instruction, and may enable usage of variable length execution sets (VLES).

In an embodiment, each of the instruction containers may be arranged to comprise up to two encoded second instructions or dual instructions encoded in a dual packed encoding space. This may be suitable for many DSPs. In an example embodiment, the first and second encoding spaces may be of the same bit width.

In another embodiment, the processing system may comprise one or more additional instruction sets encoded in one or more additional encoding spaces, each different from the other encoding spaces. This may be used for processing systems dedicated to specialized applications where usage probability of a special type of instructions may be more likely than usual.

Figure 5:
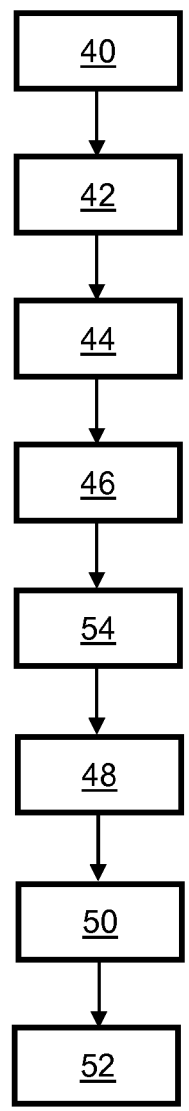
FIG. 5 schematically shows a diagram of an example of an embodiment of a method of instruction set encoding space utilization.

Referring to FIG. 5, a diagram of an example of an embodiment of a method of instruction set encoding space utilization is schematically shown. The method shown in FIG. 5 allows implementing the advantages and characteristics of the described processing system as part of a method of instruction set encoding space utilization. The shown method comprises encoding 40 a first instruction set comprising one or more first instructions, in a first encoding space; encoding 42 a second instruction set comprising two or more orthogonal second instructions, in a second encoding space different from the first encoding space; and encoding 44 and grouping or encapsulating 46 subsets of the second instructions in instruction containers, each instruction container sized to comprise a plurality of the second instructions.

The method may, for example, further comprise extracting 48, decoding 50 and providing 52 each subset of second instructions to a processing device operable to process in parallel each second instruction belonging to the extracted subset.

The encoding 44 and grouping 46 subsets of the second instructions in instruction containers may, for example, comprise providing a dedicated portion of each instruction word of the first and second instructions for encoding a presence of a variable length execution set (VLES) of instructions and a position of the instruction word within the variable length execution set of instructions. In the shown example, encoded instructions may consist of 32 bits. In other embodiments, the length of an instruction word may be defined differently, and/or, for example, least significant bits or any other dedicated instruction word portion may be used.

For correct decoding of provided encoded first and second instructions, the shown method, may, for example, comprise detecting 54 a presence of the instruction containers by determining a length of the variable length execution set of instructions and comparing the length to a bit width of the second encoding space. In other words, VLES of instructions comprising less bits than required for being encoded according to the second encoding space may be qualified as first instructions and VLES of instructions comprising a bit width of the second encoding space may be qualified as comprising second instructions. In the example shown in FIG. 2, instructions 26, 28 and 30 may be qualified as instructions encoded in the first 32 bit encoding space, whereas instruction container 32 may be qualified as containing instructions encoded in the second 64 bit encoding space. In another embodiment, the dedicated portion may comprise one or more additional bits for deciding whether instructions according to a first or second encoding space are contained.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on transitory or non-transitory computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the processing device 12 may be coupled to the instruction decoder 20 or may comprise the instruction decoder 20.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the processing system 10 may be implemented on a single integrated circuit. Alternatively, the examples may be implemented as any number of separate integrated circuits or separate devices interconnected with each other in a suitable manner. For example, the processing device and random access memory 24 may be implemented as separate integrated circuits.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A processing system comprising:
a processing device;
a first instruction set encoded in a first encoding space and including one or more first instructions;
a second instruction set encoded in a second encoding space different from said first encoding space and including two or more orthogonal second instructions; and
an instruction encoder arranged to encode and group subsets of said second instructions in instruction containers, each instruction container sized to include a plurality of said second instructions.

2. The processing system as claimed in claim 1, comprising
an instruction decoder arranged to extract, decode and provide each subset of second instructions to said processing device operable to process in parallel each second instruction belonging to said extracted subset.

3. The processing system as claimed in claim 1, wherein said processing device is configured to process said first instructions.

4. The processing system as claimed in claim 1, wherein said second instruction set comprises only data processing instructions.

5. The processing system as claimed in claim 1, wherein said first instruction set comprises program flow instructions.

6. The processing system as claimed in claim 1, wherein a format of said second encoded instructions is identical to a format of said first encoded instructions.

7. The processing system as claimed in claim 1, wherein a width of said instruction containers is a multiple of a width of said encoded first instruction.

8. The processing system as claimed in claim 1, wherein each of said instruction containers is arranged to comprise up to two encoded second instructions.

9. The processing system as claimed in claim 1, wherein said first and second encoding spaces are of the same bit width.

10. The processing system as claimed in claim 1, comprising one or more additional instruction sets encoded in one or more additional encoding spaces, each different from the other encoding spaces.

11. A method of instruction set encoding space utilization, comprising
encoding a first instruction set including one or more first instructions, in a first encoding space;
encoding a second instruction set including two or more orthogonal second instructions, in a second encoding space different from said first encoding space; and
encoding and grouping subsets of said second instructions in instruction containers, each instruction container sized to include a plurality of said second instructions.

12. The method as claimed in claim 11, comprising
extracting, decoding and providing each subset of second instructions to a processing device configured to process in parallel each second instruction belonging to said extracted subset.

13. The method as claimed in claim 11, wherein said encoding and grouping subsets of said second instructions in instruction containers comprises providing a dedicated portion of each instruction word of said first and second instructions for encoding a presence of a variable length execution set of instructions and a position of said instruction word within said variable length execution set of instructions.

14. The method as claimed in claim 13, comprising detecting a presence of said instruction containers by determining a length of said variable length execution set of instructions and comparing said length to a bit width of said second encoding space.

* * * * *